United States Patent
Horikawa et al.

(10) Patent No.: US 7,689,360 B2
(45) Date of Patent: Mar. 30, 2010

(54) OBSTACLE DETECTING APPARATUS WITH ERROR DETECTION AND RECOVERY

(75) Inventors: Kenichiro Horikawa, Inasa-gun (JP); Hideyuki Ide, Imabari (JP)

(73) Assignee: DENSO CORPORATION, Kariya (JP)

( * ) Notice: Subject to any disclaimer, the term of this patent is extended or adjusted under 35 U.S.C. 154(b) by 1279 days.

(21) Appl. No.: 11/189,085

(22) Filed: Jul. 26, 2005

(65) Prior Publication Data
US 2006/0025913 A1    Feb. 2, 2006

(30) Foreign Application Priority Data
Jul. 28, 2004    (JP)    ............... 2004-220651

(51) Int. Cl.
*G08G 1/16* (2006.01)
(52) U.S. Cl. .................. 701/301; 701/34; 340/435; 342/70; 307/10.1; 73/579; 73/628
(58) Field of Classification Search ................ 701/301, 701/96, 34; 340/435; 342/70; 73/579, 628; 307/10.1
See application file for complete search history.

(56) References Cited

U.S. PATENT DOCUMENTS

| | | | | |
|---|---|---|---|---|
| 5,229,975 | A * | 7/1993 | Truesdell et al. ............. | 367/107 |
| 5,265,832 | A * | 11/1993 | Wesling et al. .......... | 246/169 R |
| 5,734,338 | A | 3/1998 | Hoekman et al. | |
| 6,268,803 | B1 * | 7/2001 | Gunderson et al. .......... | 340/903 |
| 6,642,839 | B1 * | 11/2003 | Gunderson et al. .......... | 340/435 |
| 6,690,616 | B1 * | 2/2004 | Bahr et al. ..................... | 367/99 |
| 6,696,931 | B2 * | 2/2004 | Paranjpe ..................... | 340/436 |
| 6,933,837 | B2 * | 8/2005 | Gunderson et al. .......... | 340/436 |
| 7,027,356 | B2 * | 4/2006 | Bahr et al. ..................... | 367/99 |
| 7,061,372 | B2 * | 6/2006 | Gunderson et al. .......... | 340/435 |
| 7,278,314 | B2 * | 10/2007 | Sato et al. ..................... | 73/602 |
| 7,363,194 | B2 * | 4/2008 | Schlick et al. .............. | 702/182 |
| 7,519,758 | B2 * | 4/2009 | Erhart et al. ................ | 710/306 |
| 2002/0030591 | A1 * | 3/2002 | Paranjpe ..................... | 340/436 |
| 2003/0034883 | A1 | 2/2003 | Sato et al. | |
| 2005/0242931 | A1 * | 11/2005 | Gunderson et al. .......... | 340/431 |
| 2006/0016262 | A1 * | 1/2006 | Sato et al. ..................... | 73/579 |
| 2006/0025913 | A1 * | 2/2006 | Horikawa et al. ............. | 701/45 |
| 2006/0031016 | A1 * | 2/2006 | Horikawa .................... | 701/301 |
| 2009/0009306 | A1 * | 1/2009 | Magane et al. .............. | 340/435 |

FOREIGN PATENT DOCUMENTS

JP    A-6-138225    5/1994

* cited by examiner

*Primary Examiner*—Khoi Tran
*Assistant Examiner*—Brian J Broadhead
(74) *Attorney, Agent, or Firm*—Posz Law Group, PLC

(57) ABSTRACT

An obstacle detecting apparatus includes sensors and a processing unit. Each of the sensors are rendered operational by predetermined parameters. The processing unit transmits the parameters to the sensors and includes a vehicle state detector, a condition determiner, a communication controller, and a parameter setting processor. The vehicle state detector detects a running state of the vehicle. The condition determiner determines that the running state of the vehicle is one of an operating condition indicating that the sensors should be operated and a forbidding condition indicating that the operation of the sensors should be forbidden. The communication controller performs communication with the sensors. The parameter setting processor transmits the parameters to the sensors and receives a response indicating completion of the process. The parameter setting processor repeats the process upon either a parameter of one sensor not being set, or communication being terminated while the forbidding condition is identified.

16 Claims, 2 Drawing Sheets

OBSTACLE DETECTING APPARATUS WITH ERROR DETECTION AND RECOVERY

CROSS REFERENCE TO RELATED APPLICATIONS

This application is based upon and claims the benefit of priority of Japanese Patent Application No. 2004-220651, filed on Jul. 28, 2004 the contents of which are incorporated herein by reference.

FIELD OF THE INVENTION

The present invention relates to an obstacle detecting apparatus.

BACKGROUND OF THE INVENTION

Conventionally, there is known an obstacle detecting apparatus including a plurality of sensors and a control device, which are connected to each other through a bus (for example, see Japanese Patent Laid-Open Publication No. 2003-152741). According to an obstacle detecting apparatus disclosed in this patent reference, for example, a control device sequentially sets, through a bus, the IDs of connecting positions of the ultrasonic sensor from the ultrasonic sensor closest to the control device based on pre-stored connection sequence and IDs of ultrasonic sensors. Then, when the ID setting is completed for the last ultrasonic sensor, the control device starts communicating with each of the ultrasonic sensors.

In the above-described conventional obstacle detecting apparatus, each of the ultrasonic sensors functions as a sensor only after a parameter such as an ID to be set can be normally received in the first communication with the control device. Therefore, unless the parameter can be normally received, each of the ultrasonic sensors cannot function as a sensor.

Accordingly, if a communication error occurs during parameter setting, a process of setting a parameter again or stopping the communication with a sensor, which cannot receive a parameter is required to be performed.

In the parameter resetting, however, it is required to retransmit a parameter after each of the sensors is once powered OFF. Therefore, a long time is needed to reset a parameter so as to reestablish the communication. Moreover, if the communication with the sensor that cannot receive the parameter is continuously interrupted in the case where a temporary communication error such as the interference of an electromagnetic wave noise occurs, the communication with the sensor cannot be reestablished thereafter.

SUMMARY OF THE INVENTION

Embodiments of the present invention have been devised in view of the above-described and other problems, and has at least one object, which is to provide an obstacle detecting apparatus capable of recovering from a communication error without taking time required for a process of reestablishing communication into consideration when a recoverable communication error occurs.

According to one aspect of the embodiments of the present invention, an obstacle detecting apparatus includes sensors rendered operational by setting a predetermined parameter, and a processing unit for transmitting the parameters to the sensors. The obstacle detecting apparatus is for detecting an obstacle present in the vicinity of a vehicle via the sensors. The processing unit includes vehicle state detection means for detecting a running state of the vehicle, condition determination means for determining that the running state of the vehicle corresponds to an operating condition indicating a condition under which the sensors should be operated and a forbidding condition indicating a condition under which operation of the sensors should be forbidden, communication control means for communicating with the sensors, and parameter setting process means for implementing a parameter setting process of transmitting the parameters to the sensors and receiving a response indicating completion of the parameter setting process from each of the sensors. In this configuration, the parameter setting process means repeats the parameter setting process for all the sensors if there is at least one sensor in which the parameter is not set and/or with which communication by the communication control means is impossible in the case where the condition determination means determines that the running state of the vehicle corresponds to the forbidding condition.

As described above, the obstacle detecting apparatus of the embodiments of the present invention implement the parameter setting process again for all the sensors if there is at least one sensor in which the parameter is not set and/or with which the communication is impossible in the case where the running state of the vehicle corresponds to the forbidding condition for forbidding the operation of the sensors. While the running state of the vehicle corresponds to the forbidding condition, the sensors do not perform the detection of an obstacle. Therefore, it is not necessary to take time required for a process of reestablishing the communication after the occurrence of a communication error into consideration.

Moreover, if the parameter setting process under the forbidding condition can normally set the parameter, the sensor is rendered operational. Therefore, in the case where a recoverable communication error occurs, the communication can be reestablished after the occurrence of the communication error.

According to another aspect of the invention, the obstacle detecting apparatus is configured such that the parameter setting process means implements the parameter setting process after the processing unit is powered ON. As a result, the sensors, in which the parameters are normally set, can be rendered operational.

According to yet another aspect of the invention, the obstacle detecting apparatus further comprises error determination means for determining the occurrence of an error if the communication with the sensor is impossible by the communication control means for a predetermined time or longer. As a result, the occurrence of a continuous error under the operating condition can be determined.

According to yet another aspect of the invention, the obstacle detecting apparatus further comprises error warning means for warning of the occurrence of an error in any one of the case where the occurrence of an error is determined by the error determination means and the case where a response indicating completion of parameter setting cannot be received in the parameter setting process by the parameter setting process means. As a result, a vehicle passenger can be warned of the occurrence of an error.

According to still another aspect of the invention, the obstacle detecting apparatus is configured such that the error warning means includes at least one of display means having a display screen and sound output means for outputting a sound. As a result, the vehicle passenger can recognize the occurrence of an error through the display screen or the sound.

According to still another aspect of the invention, the obstacle detecting apparatus is configured such that the vehicle state detection means detects a speed of the vehicle and a shift position of a transmission of the vehicle, and the condition determination means determines that the running state of the vehicle corresponds to the operating condition in the case where the vehicle speed is equal to or lower than a predetermined speed and the transmission is at a shift position for driving the vehicle forward or reverse. As a result, in the case where the running of a vehicle requires special attention, for example, for putting the vehicle into a garage or for driving through a narrow street, the detection of an obstacle can be implemented by the sensors.

According to still yet another aspect of the invention, the obstacle detecting apparatus is configured such that the sensors implement the detection of an obstacle if the condition determination means determines that the state regarding the running of the vehicle corresponds to the operating condition and stops the detection of an obstacle if the condition determination means determines that the state regarding the running of the vehicle corresponds to the forbidding condition. As a result, the sensors can be rendered operational when the running of a vehicle requires special attention, whereas the operation of the sensors can be stopped when the running of a vehicle does not require any special attention.

According to still yet another aspect of the invention, the obstacle detecting apparatus is configured such that a plurality of the sensors are provided in any one of a front bumper and a rear bumper of the vehicle. As a result, an obstacle present in front of or behind the vehicle can be detected.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENT

Hereinafter, an embodiment, to which the present invention is applied, will be described with reference to the accompanying drawings. The mode for carrying out the present invention is not limited to the following embodiment. It is apparent that various modes are possible without departing from the technical scope of the present invention.

Figure 1:
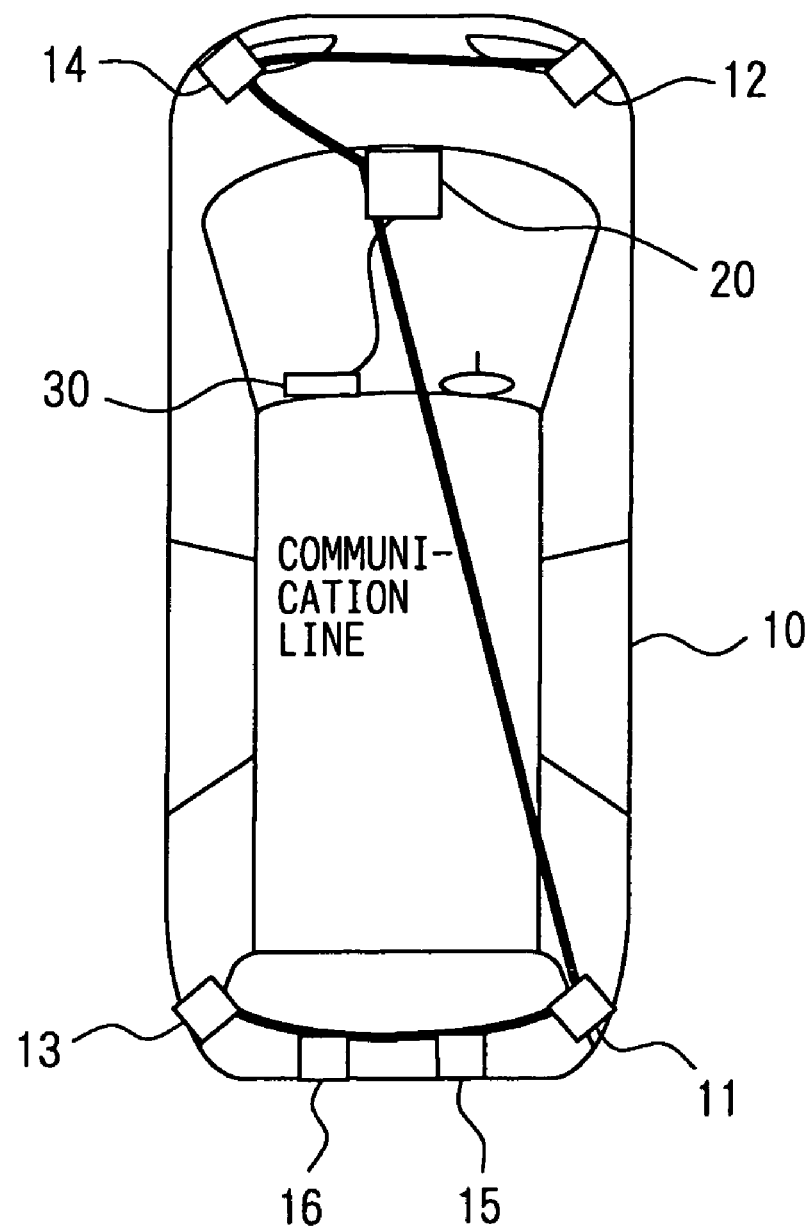
FIG. 1 is a top view of an obstacle detecting apparatus according to an embodiment of the present invention installed in a vehicle.

FIG. 1 is a top view of an obstacle detecting apparatus according to an embodiment of the present invention installed in a vehicle 10. The obstacle detecting apparatus is used for notifying a driver of the presence of an obstacle in front of or behind the vehicle 10 and a distance between the obstacle and the vehicle 10.

The obstacle detecting apparatus includes sensors 11 to 16, a processing unit 20, and a warning device 30. The sensors 11 to 16 and the processing unit 20 are connected to each other through a communication line provided in a bus topology. The sensors 11 to 16 and the processing unit 20 communicate with each other through transmission and reception of a communication frame.

Each of the sensors 11 to 16 includes an ultrasonic sensor provided in a front bumper or a rear bumper of the vehicle 10 and serve to detect an obstacle present in front of or behind the vehicle 10. Each of the sensors 11 to 16 further includes a transmission section for transmitting an ultrasonic wave, a receiving section for receiving a reflected ultrasonic wave, and a control circuit for measuring a distance to an obstacle based on the time required for the ultrasonic wave to strike the obstacle and reflect back to the sensor, as well as for communicating with the processing unit 20.

Each of the sensors 11 to 16 receives and stores a parameter setting frame containing a parameter described below, which is transmitted from the processing unit 20 to store the received parameter. Then, a transmission frequency contained in the stored parameter is set as a frequency of the ultrasonic wave transmitted from the transmission section. In this manner, each of the sensors 11 to 16 becomes operational by setting a parameter.

The processing unit 20 transmits various communication frames to the sensors 11 to 16 while receiving a detection result frame including a distance to an obstacle measured by the sensors 11 to 16 to recognize the position of and the distance to the obstacle. The processing unit 20 is also connected to external sensors. As the external sensors, a vehicle speed sensor and a shift position sensor, both not shown, are provided.

The processing unit 20 includes a non-volatile memory (not shown). An ID in accordance with the location where each of the sensors 11 to 16 is installed, the transmission frequency of an ultrasonic wave and the like (hereinafter, referred to as parameters) are written to the non-volatile memory.

After being powered ON, the processing unit 20 sequentially transmits the parameter setting frames for setting the above-described parameters to the sensors 11 to 16 based on the proximity of each sensor to the processing unit 20. Then, the processing unit 20 implements a parameter setting process for receiving a parameter setting completion frame from the sensor in which the parameter is normally set. In this manner, since the parameter setting process is implemented after the processing unit 20 is powered ON, the sensor in which the parameter is normally set can be rendered operational.

In the parameter setting process, if there is any sensor from which the parameter setting completion frame cannot be received (in which the parameter is not normally set), the processing unit 20 stops communication with the corresponding sensor so as to perform communication only with the sensors from which the parameter setting completion frames can be received (in which the parameter is normally set).

The warning device 30 includes an image display device having a liquid crystal display and a sound output device. The image display device displays the position of the obstacle recognized by the processing unit 20 in real time. The sound output device outputs a sound in accordance with the distance to the obstacle, recognized by the processing unit 20.

Next, a detection process, through which the obstacle detecting apparatus detects an obstacle, according to this embodiment of the present invention will be described with reference to a flowchart in FIG. 2. First, after the processing unit 20 is powered ON at S100, the processing unit 20 starts communicating with the sensors 11 to 16 at S200 so as to implement the above-described parameter setting process.

It is determined at S300 whether or not the parameters are normally set in the sensors 11 to 16 in the parameter setting process. If it is determined that the parameters are normally set in all the sensors 11 to 16, a status flag is set to "Normal: 0" so that the process proceeds to S400.

On the other hand, if it is determined that the parameter is not normally set in any of the sensors 11 to 16 at S300, communication with the corresponding sensor is interrupted at S310 so that the warning device 30 warns of the occurrence of a communication and/or sensor error. Then, at S320, the status flag is set to "Error: 1". As a result, a passenger including a vehicle driver can recognize the occurrence of an error in the obstacle detecting apparatus via the display screen or the sound.

At S400, it is determined whether a vehicle running state corresponds to a condition under which the sensors 11 to 16 should be operated or a condition under which the operation of the sensors 11 to 16 should be forbidden. This is based on the detection result of the vehicle speed sensor and the shift position sensor.

Specifically, the obstacle detecting apparatus according to this embodiment performs obstacle detection in the case where the running of a vehicle requires special attention. For example, while parking the vehicle in a garage or driving through a narrow street. Therefore, when a vehicle speed is equal to or lower than a predetermined speed (for example, 10 km/h) and the shift position is in a reverse range (R-) or in a forward range (for example, 1-, 2-, 3-, or D-), it is determined that the vehicle running state corresponds to the operating state.

On the other hand, when the vehicle speed exceeds the above-described predetermined speed and the shift position is in a parking range (P-) or a neutral range (N), it is determined that the vehicle running state corresponds to the forbidding condition. As a result, the sensors 11 to 16 can be operated when the running of the vehicle requires special attention, and the operation of the sensors 11 to 16 can be stopped when no special attention is required.

If it is determined at S400 that the vehicle running state corresponds to the operating condition, the process proceeds to S500. On the other hand, if it is determined that the vehicle running state corresponds to the forbidding condition, the process proceeds to S600. At S500, communication with the sensor, in which the parameter is normally set, is started so that a detection instruction frame for instructing the corresponding sensor to start detecting an obstacle is transmitted to the sensor. The sensor receiving the detection instruction frame starts detecting an obstacle and then transmits the detection result frame containing the detection result to the processing unit 20.

At S510, it is determined whether or not communication with the sensor, in which the parameter can be normally set, is impossible for a predetermined time (for example, about several seconds) or longer. If it is determined YES at this step, the process proceeds to S520. If it is determined NO, the process returns to S400.

As described above, if communication with the sensor is impossible for a predetermined time or longer under the operating condition, it is determined that a communication error occurs. As a result, a continuous communication (and/or sensor) error, which occurs while the sensors are detecting an obstacle, can be identified.

At S520, communication with the corresponding sensor is stopped so that the warning device 30 warns of the occurrence of a communication (and/or sensor) error during the detection of an obstacle. As a result, a vehicle passenger can be warned of the occurrence of a communication (and/or sensor) error. At S530, the status flag is set to "Error: 1".

If it is determined at S400 that the vehicle running state corresponds to the forbidding condition, it is determined at S600 whether or not the status flag indicates "Error: 1". If it is determined YES at S600, the process proceeds to S610. On the other hand, if it is determined NO at S600, it is determined that the communication with the sensors 11 to 16 is normal so that the process returns to S400 until the vehicle running state corresponds to the operating condition in the next process at S400.

At S610, since there is at least one sensor with which communication is stopped, that is, at least one sensor in which the parameter is not normally set in the process at S310 or S520, and/or with which communication is continuously impossible for a predetermined time or longer under the operating condition, communication with all the sensors 11 to 16 is reestablished so as to repeat the above-described parameter setting process for all the sensors. At S620, it is determined whether or not the parameters are normally set in the sensors with which communication is reestablished.

If it is determined YES at S620, the process proceeds to S630. On the other hand, if it is determined NO at S620, communication with the corresponding sensor is stopped again at S640 and the process returns to S400. The status flag is set to "Normal: 1" at S630, and then the process returns to S400. As a result, after it is determined in the next process at S400 that the running state corresponds to the operating condition, the obstacle detection is started in the process after S500 by the sensor with which communication is reestablished.

As described above, if there is at least one sensor in which the parameter is not set and/or with which communication is continuously impossible for a predetermined time or longer, under the forbidding condition for forbidding the operation of the sensors, the parameter setting process is repeated for all the sensors. While the vehicle running state corresponds to the forbidding condition, the sensors do not detect an obstacle. Therefore, it is not necessary to consider time required for a process of reestablishing communication after the occurrence of a communication error.

Moreover, if the parameter setting process can normally set the parameter under the forbidding condition, the sensor becomes operational. Therefore, when a recoverable communication error occurs, the communication can be reestablished after the occurrence of the communication error.

Figure 2:
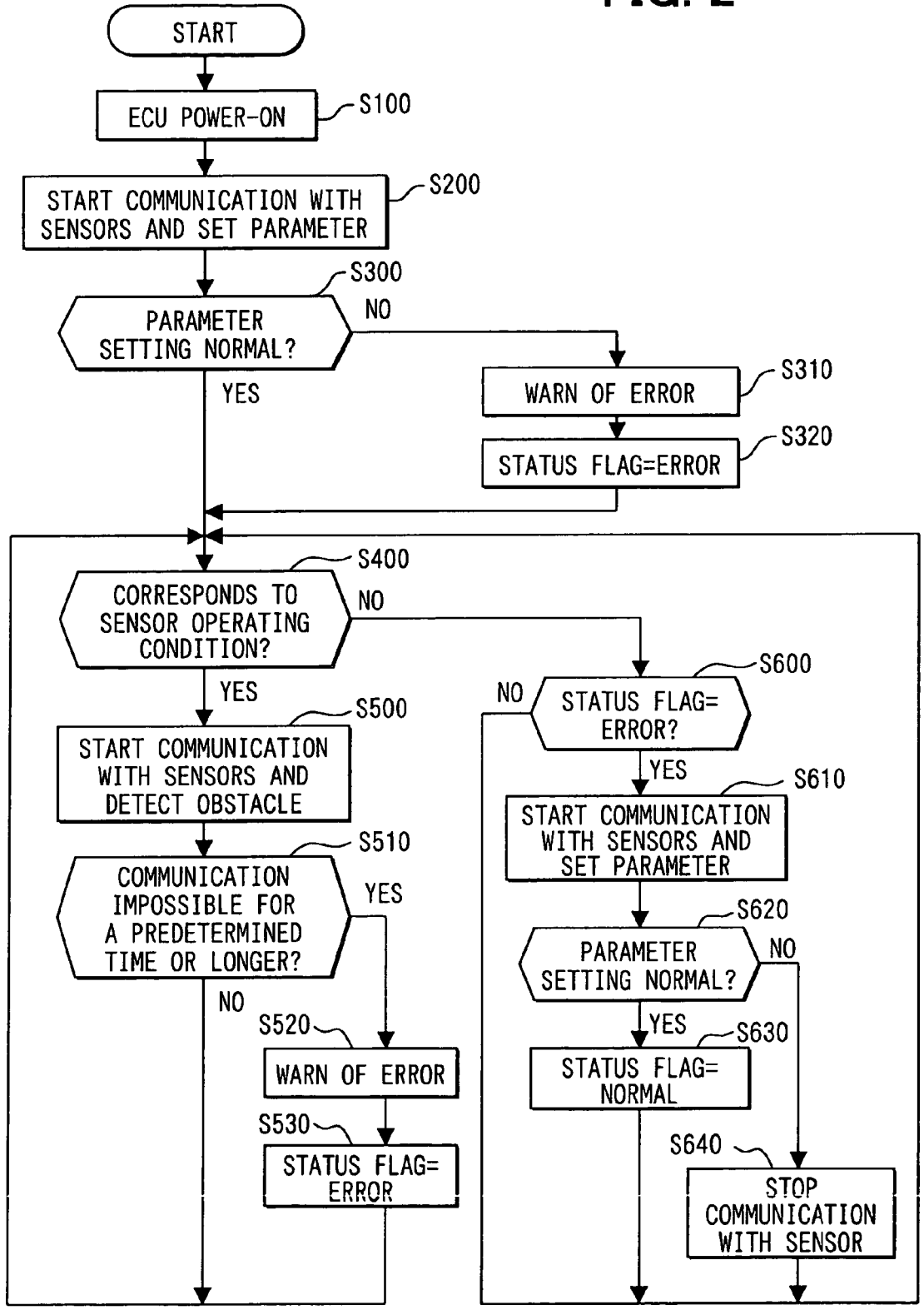
FIG. 2 is a flowchart of a process through which the obstacle detecting apparatus of FIG. 1 detects an obstacle.

It should be appreciated that while the above-described process has been described herein according to the sequence of steps illustrated in FIG. 2, alternative or supplemental steps may be implemented in an alternative or supplemental sequence without departing from the spirit and scope of the present invention. Furthermore, alternative embodiments including alternative sequences of the steps described herein are also intended to be within the scope of the present invention.

What is claimed is:

1. An obstacle detecting apparatus for detecting the presence of an obstacle in the vicinity of a vehicle, comprising:
   plural sensors, each rendered operational by one of plural predetermined parameters; and
   a processing unit for transmitting the plural predetermined parameters to the plural sensors, the processing unit comprising:
      vehicle state detector configured to detect a running state of the vehicle,
      condition determiner configured to determine that the running state of the vehicle corresponds to one of an operating condition that indicates that the plural sensors should be operated and a forbidding condition that indicates that the operation of the plural sensors should be forbidden,
      communication controller configured to communicate with the plural sensors, and
      parameter setting processor configured to implement a parameter setting process for transmitting the plural predetermined parameters to the plural sensors and receiving a response from each of the plural sensors that indicates completion of the parameter setting process, wherein the parameter setting processor repeats the parameter setting process for all of the plural sensors upon at least one of the following occurring:
the parameter of at least one sensor of the plural sensors is not set, and
communication by the communication controller is impossible,
when the condition determiner determines that the running state of the vehicle corresponds to the forbidding condition.

2. The obstacle detecting apparatus according to claim 1, wherein
the parameter setting processor implements the parameter setting process after the processing unit is powered ON.

3. The obstacle detecting apparatus according to claim 1, further comprising error identifier configured to identify the occurrence of an error if the communication with the at least one sensor by the communication controller is impossible for a predetermined time or longer 4. The obstacle detecting apparatus according to claim 3, further comprising error warning means for warning that the occurrence of an error has been identified in any one of the cases where the occurrence of an error is identified by the error identifier and the case where a response indicating completion of the parameter setting process cannot be received by the parameter setting processor.

5. The obstacle detecting apparatus according to claim 4, wherein
the error warning means includes at least one of display means having a display screen and sound output means for outputting a sound.

6. The obstacle detecting apparatus according to claim 1, wherein:
the vehicle state detector detects a speed of the vehicle and a shift position of a transmission of the vehicle; and
the condition determiner determines that the running state of the vehicle corresponds to the operating condition when the vehicle speed is equal to or lower than a predetermined speed and the transmission is at a shift position for driving the vehicle forward or reverse.

7. The obstacle detecting apparatus according to claim 1, wherein
the plural sensors implement the detection of an obstacle if the condition determiner determines that the running state of the vehicle corresponds to the operating condition and stops the detection of an obstacle if the condition determiner determines that the running state of the vehicle corresponds to the forbidding condition.

8. The obstacle detecting apparatus according to claim 1, wherein
the plural sensors are provided in any one of a front bumper and a rear bumper of the vehicle.

9. An obstacle detecting apparatus for detecting the presence of an obstacle in the vicinity of a vehicle, comprising:
a sensor rendered operational by a predetermined parameter; and
a processing unit for transmitting the predetermined parameter to the sensor, the processing unit comprising:
a vehicle state detector for detecting a running state of the vehicle,
a condition determiner for determining that the running state of the vehicle corresponds to one of an operating condition that indicates that the sensor should be operated and a forbidding condition that indicates that the operation of the sensor should be forbidden,
a communication controller for communicating with the sensor, and
a parameter setting processor for implementing a parameter setting process for transmitting the predetermined parameter to the sensor and receiving a response from the sensor that indicates completion of the parameter setting process, wherein
the parameter setting processor repeats the parameter setting process for the sensor upon at least one of the following occurring:
the predetermined parameter of the sensor is not set, and
communication by the communication controller is impossible,
when the condition determiner determines that the running state of the vehicle corresponds to the forbidding condition.

10. The obstacle detecting apparatus according to claim 9, wherein
the parameter setting processor implements the parameter setting process after the processing unit is powered ON.

11. The obstacle detecting apparatus according to claim 9, further comprising an error identifier for identifying the occurrence of an error if the communication with the sensor by the communication controller is impossible for a predetermined time or longer.

12. The obstacle detecting apparatus according to claim 11, further comprising an error warning device for warning that the occurrence of an error has been identified in any one of the cases where the occurrence of an error is identified by the error identifier and the case where a response indicating completion of the parameter setting process cannot be received by the parameter setting processor.

13. The obstacle detecting apparatus according to claim 12, wherein the error warning device includes at least one of a display having a display screen and speaker for outputting a sound.

14. The obstacle detecting apparatus according to claim 9, wherein:
the vehicle state detector detects a speed of the vehicle and a shift position of a transmission of the vehicle; and
the condition determiner determines that the running state of the vehicle corresponds to the operating condition when the vehicle speed is equal to or lower than a predetermined speed and the transmission is at a shift position for driving the vehicle forward or reverse.

15. The obstacle detecting apparatus according to claim 9, wherein
the sensor implements the detection of an obstacle if the condition determiner determines that the running state of the vehicle corresponds to the operating condition and stops the detection of an obstacle if the condition determiner determines that the running state of the vehicle corresponds to the forbidding condition.

16. The obstacle detecting apparatus according to claim 9, wherein
the sensor one of a plurality of sensors provided in any one of a front bumper and a rear bumper of the vehicle.

* * * * *